Aug. 22, 1961   F. SÖDING   2,997,516
GASTIGHT ENCLOSED ALKALINE ACCUMULATOR
Filed Nov. 30, 1953
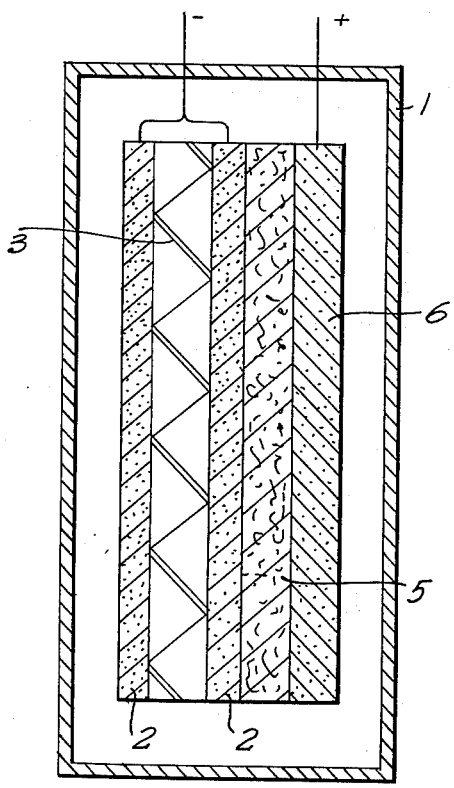
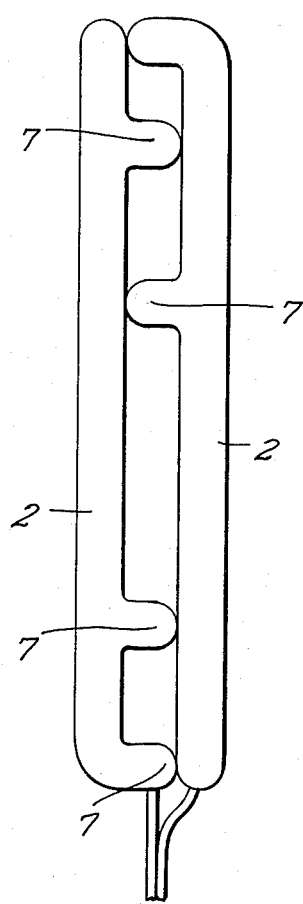
INVENTOR
Fritz Söding
BY
ATTORNEY

United States Patent Office 2,997,516
Patented Aug. 22, 1961

2,997,516
GASTIGHT ENCLOSED ALKALINE ACCUMULATOR
Fritz Söding, Westhofen, Germany, assignor to Accumulatorenfabrik Aktiengesellschaft, Frankfurt am Main, Germany
Filed Nov. 30, 1953, Ser. No. 395,265
Claims priority, application Germany Dec. 1, 1952
9 Claims. (Cl. 136—37)

The present invention relates to a gastight enclosed alkaline accumulator.

In permanently gastight enclosed alkaline accumulators, gas electrodes made of platinum or metals of the platinum group have frequently been used for the removal of the gases evolved while the accumulator is operating or inactive.

The use of gas electrodes, however, entails some disadvantages, so that according to more recent suggestions the electrode surfaces themselves were used for gas consumption. In such an arrangement, the elimination of hydrogen gas, which is sometimes developed, causes difficulties.

It has, however, been discovered that the oxygen pressure may rise to several atmospheres before the state of equilibrium between gas evolution and gas consumption is reached. This is principally due to the fact that the gas-absorbing surface of the negative electrode is comparatively small, since it is covered to a large extent by the separator and the electrolyte absorbed therein.

In order to keep the gas pressure as low as possible in such gastight enclosed cells, it is necessary to increase the gas-absorptive surface of the negative electrode which is in contact with the gas space.

According to the invention, this may be accomplished for instance by dividing the negative plate into two plates spaced apart from each other, said plates having the same or larger sizes, and each having e.g. half of the capacity, of the usual plates; the two plates are, therefore, of a smaller thickness. Between the two partial plates there is a gap which is not filled with electrolyte, in which therefore the gases present in the interior of the cell are capable of contacting the electrode surfaces newly created by the splitting of the electrode. In order to space the electrodes with a gap therebetween, an intermediate piece of conductive or non-conductive material will be interposed between the two partial electrodes or the edges of their plates; spacing of the two half plates will be effected thereby to such an extent that the electrolyte therebetween will not adhere to the plates by capillarity, since otherwise the object of this invention, i.e. the reduction of gas pressure, due to an increase of gas absorption velocity, would not be achieved.

If the spacing member contains mesh or apertures, for instance if it is made of a wire fabric or metal mesh, the mesh or the apertures have to be so large that no electrolyte will adhere thereto.

The spacing of the two plates may also be accomplished by shaping the plates themselves in such away that they remain spaced from each other, for instance by providing cams thereon, or by punching projecting elements of various shape thereon.

If for spacing the two negative half-plates, metallic layers are interposed, for instance a wide wire fabric or metal mesh, these metallic intermediate layers may be coated in a known manner with noble metals, such as platinum or palladium, and may then be used as gas electrodes. The metallic mass container may likewise be provided with a coating of noble metals for the same purpose. By these measures, the effectiveness of the uncovered surfaces of the negative electrode as regards gas consumption is enhanced and the rate of gas consumption is further increased. More particularly, additional hydrogen can be consumed by this method.

The spaced pairs of negative half-plates are used according to this invention instead of the conventional single negative plate.

As a separator between facing parts of electrodes of opposite polarity, known porous, absorptive, non-conductive layers are used which are in contact with the electrode surface and which absorb the electrolyte necessary for flow of current.

Reference is made to the accompanying drawings in which:

FIG. 1 is a schematic elevational view in cross section of a permanently enclosed gas tight alkaline accumulator including a negative electrode structure in accordance with the present invention; and FIG. 2 is another embodiment of the negative electrode structure according to the present invention.

Referring now to the drawing, reference numeral 1 denotes the casing of the permanently enclosed gastight alkaline accumulator, reference numeral 2 indicates the two portions of the split negative electrode, spacer means 3 is shown between the two portions of the splite negative electrode and separator 5 is interposed between negative electrode 2 and positive electrode 6. The plate-shaped split negative electrode illustrated in FIG. 2 includes as spacer means projection 7 adapted to maintain adjacent faces of the split electrode at a predetermined distance from each other.

By the novel means provided according to this invention, it is accomplished that the amount of oxygen evolved at the positive electrode escapes into the gas space and gets into large-area contact with the two uncovered faces of the negative part electrodes remote from the positive electrode where it is rapidly consumed. This oxygen consumption occurs without participation of the active masses according to the equation $$O_2 + 2H_2O \rightarrow 4OH^-$$

or $$4OH^- \rightarrow O_2 + 2H_2O$$

The pressures arising under these conditions in the permanently gastight enclosed alkaline accumulators, do not surpass the limit of 1.0 atmosphere superpressure with the ordinary charging current of, for instance, 5 hours; even longer charging time or heavier supercharge will, in general, not be harmful. The cell construction is thereby simplified, for instance by the use of lighter element containers, and safety in operation is increased.

With cells built according to the present invention, the use of additional safety measures against excessive pressure, such as an automatic switch cutting off the current upon occurrence of superpressure, will be dispensible.

What I claim is:

1. A permanently enclosed gastight alkaline accumulator of the type containing an immobilized electrolyte and a porous non-conductive separator for the absorption of said electrolyte, said accumulator comprising a negative electrode divided into two part-electrodes facing one another at a small distance leaving free therebetween a space which is substantially free of electrolyte over at least a considerable part thereof and filled by gas present in the cell interior.

2. An accumulator according to claim 1, comprising a spacing means interposed between the two parts of the negative electrode and arranged to space the same from each other.

3. An accumulator according to claim 2, wherein said spacing means consists of metal.

4. An accumulator according to claim 3, wherein the metallic spacing means is coated with noble metal.

5. In an accumulator according to claim 1, a negative electrode consisting of two-part electrodes having plates shaped with spacing elements thereon.

6. In an accumulator according to claim 1, a negative electrode consisting of two-part electrodes having plates shaped with projections thereon capable of maintaining the two parts of the electrode in spaced relationship.

7. An accumulator according to claim 2, wherein said spacing means consists of metal mesh.

8. An accumulator according to claim 2 wherein the interposed spacing means is formed with apertures.

9. An accumulator according to claim 8, wherein said apertures are so dimensioned that no electrolyte will adhere thereto by capillarity.

References Cited in the file of this patent

UNITED STATES PATENTS

| | | |
|---|---|---|
| 2,104,973 | Dassler | Jan. 11, 1938 |
| 2,131,592 | Lange et al. | Sept. 16, 1938 |
| 2,571,927 | Neumann et al. | Oct. 16, 1951 |
| 2,614,138 | Jacquier | Oct. 14, 1952 |
| 2,651,669 | Neumann | Sept. 8, 1953 |